United States Patent Office

3,761,444
Patented Sept. 25, 1973

3,761,444
EQUILIBRATION OF EPOXY SUBSTITUTED SILOXANES IN PRESENCE OF WATER AND SILANOL
Frank D. Mendicino, Marietta, Ohio, assignor to Union Carbide Corporation, New York, N.Y.
No Drawing. Filed Aug. 18, 1969, Ser. No. 851,045
Int. Cl. C08f *11/04*
U.S. Cl. 260—46.5 Y         3 Claims

ABSTRACT OF THE DISCLOSURE

This invention is an improvement in the manufacture of epoxy substituted siloxanes. Lower molecular weight epoxy substituted siloxanes are equilibrated with other siloxanes to produce siloxane copolymers containing the substituents of both the epoxy siloxane and the other siloxanes. This is accomplished with a basic equilibration catalyst and in the presence of small quantities of water and silanol.

---

This invention relates to the manufacture of fluid epoxy substituted polysiloxanes. More particularly, this invention relates to a method for making a variety of fluid epoxy substituted polysiloxanes.

There is described in U.S. Pat. No. 3,431,143, patented Mar. 4, 1969, assigned to the same assignee as this invention, the utilization of epoxy substituted copolymeric polysiloxanes to improve the water resistance of paper. The fluid epoxy substituted polysiloxane copolymers described in that patent are characterized by the general formula:

$$M D_x U_y M'_q$$

wherein D represents an $R_2SiO$ unit in which R is a monovalent hydrocarbon radical free of acetylenic unsaturation; U represents a unit selected from the class consisting of

and $R'SiO_{3/2}$ in which R is a monovalent hydrocarbon radical free of acetylenic unsaturation and R' is a monovalent organic radical containing at least one vicinal epoxy

group; M and M' are in each occurrence and end-blocking unit having the formula:

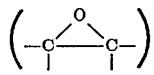

in which R is a monovalent hydrocarbon radical free of olefinic unsaturation, R' is a monovalent organic radical containing a vicinal epoxy

group, $a$ has a value from 0 to 1 inclusive; $q$ has a value of 1 when U is an

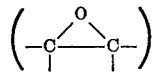

unit and a value of $(y+1)$ when U is an $R'SiO_{3/2}$ unit, $x$ is an integer having a value of from about 10 to about $10^5$, $y$ is an integer having a value of from about 1 to about $10^2$, the sum of $x$, $y$ and $q$ being such that the copolymer $MD_xU_yM'_q$ has a molecular weight of from about $10^3$ to about $10^6$ and the mole ratio of epoxy-containing siloxy units therein to siloxy units therein containing no epoxy groups is within the range of from about 0.0001 to 0.5.

As described in the aforementioned patent, such epoxy substituted polysiloxane copolymers are produced by reacting an unsaturated epoxy monomer with a siloxane copolymer in which a portion of such copolymer contains hydrogen bonded directly to silicon. Conventional techniques for effecting such reaction are described in that patent. The method described has been found to be difficult to handle, time consuming in terms of length of reaction necessary to achieve the desired product, expensive in terms of the cost of manufacture of the starting siloxane copolymer and further, the process is limited to small scale equipment. The critical area in effecting the process described in the aforementioned patent is the difficult preparation involved in making the high molecular weight, low silanic hydrogen content, siloxane fluid which is the intermediate used in the addition reaction with the ethylenically unsaturated epoxide.

There is a method described herein which avoids substantially the difficulties attendant the methods of preparation heretofore employed for making epoxy substituted polysiloxane copolymers. Contrasted with the prior methods for making epoxy substituted polysiloxane copolymer fluids, the method of this invention is distinguished by its quick reaction time, relatively low cost of production, ease of handling, and its adaptability to large scale equipment; hence can be employed in large scale production. Most particularly, the process of this invention removes the very difficult preparation attendant with making a high molecular weight silanic-hydrogen containing polymer fluid which in the prior art process is the intermediate made for reaction with ethylenically unsaturated epoxy monomers.

It is well recognized in processing chemicals that water, which is typically present in most reactions, is difficult and expensive to remove. In reactions that are sensitive to the presence of water, such removal is necessary yet if the reaction can be carried out in the presence of such water, a considerable cost savings is obtainable. It has been found surprising that an epoxy modified siloxane of relatively low molecular weight can be equilibrated with other low molecular weight siloxanes in the presence of measurable quantities of water using a conventional basic equilibration catalyst without effecting to any significant extent epoxy side reactions. This discovery is most surprising in view of the fact that water is known to contain an active hydrogen which is reactable with the epoxy ring whereby to open it and convert the epoxide to an alcohol. Such reaction is known to be accelerated in the presence of an acid or basic catalyst therefor. It has been found in making higher molecular weight epoxy substituted polysiloxane fluids that if the normal quantity of water entrained with the siloxanes, and soluble therein, is present during equilibration using strong basic catalyst, the water does not interfere with the manufacture of a linear relatively high molecular weight epoxy substituted polysiloxane copolymer fully comparable to those produced in the art.

It has been described by Plueddemann et al., Journal of the American Chemical Society, vol. 81, pages 2632 to 2635, June 5, 1959, that "in the absence of active hydrogen compounds the siloxane portion of the epoxy-organosiloxanes may undergo alkali-catalyzed rearrangement or 'equilibration' without opening the oxirane ring." At Table 3 of the Plueddemann et al. article, page 2634, there is disclosed the use of water as a reactant for the oxirane group to produce a dihydroxyorganosiloxane. It is also well recognized in the epoxy resin field that water contains active hydrogens to effect reaction with the oxirane ring to produce hydroxyl groups. Thus it has been clearly established in the art that the presence of water or other compounds containing active hydrogen deleteriously affect the treatment of epoxy siloxanes if it is desired not to open up the oxirane ring. Plueddemann et al. clearly indicate that the manufacture of siloxanes containing epoxy groups by equilibration of epoxy substituted siloxanes cannot be effected in the presence of water. It is clear that the art recognizes the equilibration of epoxyorganosiloxanes so long as water is totally absent. It is also apparent from the teachings of Plueddeman et al. that insoluble water in the polysiloxane used for equilibration will not affect the oxirane ring unless there is a catalyst present to initiate reaction of water with the oxirane ring.

In addition to water, another active hydrogen containing material is one which contains a silanol group, that is, Si—OH. The silanol hydrogen is active in the same sense as the hydrogen of an alcohol or water. The presence of such materials also can deleteriously effect the equilibration of epoxy polysiloxane pursuant to Plueddemann et al.

It has been found surprising that one can produce in the presence of such active hydrogen containing materials an epoxy polysiloxane copolymer by equilibrating a cyclic polysiloxane and another linear siloxane, either one of which contains epoxyorgano substituents. Such materials may be equilibrated in the presence of a strong basic catalyst without adversely effecting the oxirane content of the resulting copolymer. That is, the resulting copolymer contains essentially the same epoxy content, by weight, as does the mixture of ingredients, by weight, contains epoxy groups therein. However, it has been found that it is advantageous to limit the quantity of active hydrogen containing compound present during the equilibration reaction. It has been found desirable to provide not more than 1 weight percent of active hydrogen containing compound present in the reaction mixture, based on the weight of the reaction mixture. Typically, not less than 0.005 weight percent of active hydrogen is present in the reaction mixture during equilibration. The term active hydrogen containing compounds covers water and Si—OH. The total weight of these materials should not exceed the limits expressed above. In the preferred practice of this invention, it is desirable to provide not more than 0.5 percent by weight of the aforementioned active hydrogen containing compounds. In the usual case, there will be present not less than 0.01 weight percent of the active hydrogen containing compounds in the reaction. The advantage of effecting the reaction in the presence of such amounts of the active hydrogen containing compounds is that these amounts represent the typical quantities of soluble active hydrogen compound, in the case of water, contained in the materials undergoing the reaction.

Thus this invention relates to the equilibration of at least a cyclic polysiloxane substituted with organic substituents, which either may be epoxy-containing or not, with a linear siloxane extending in molecular weight from a disiloxane to a higher molecular weight polysiloxane, which also may contain epoxy containing substituents. In any case, at least one of the cyclic or linear aliphatic polysiloxanes contains an epoxy substituent thereon. The equilibration reaction is effected in the presence of a strong base such as an alkali metal containing base, e.g., potassium or cesium containing salts, or a quaternary ammonium or phosphonium base.

The siloxanes which are to be equilibrated, as indicated above, have relatively low molecular weights. In the usual case, each siloxane contains not more than about 20 to 80 siloxy units therein. In addition, the individual siloxanes used in the equilibration reaction have an organo to Si ratio typically of at least about 2. One of the organosiloxanes used in the equilibration reaction is a cyclic siloxane, that it, the siloxy units are joined to form a ring compound of repeating Si—O. Each silicon atom of such cyclic compounds contains 2 organo substituents bonded thereto such as an organo group which is bonded to silicon by a carbon-silicon bond. Such cyclic siloxanes may also contain relatively non-hydrolyzable organooxy groups bonded directly to silicon by a carbon-oxygen-silicon bond.

The cyclic siloxanes characterized above may be illustrated by the following formula:

(A) 

wherein R″ and R° may be the same or different substituents bonded directly to Si, such as those substituents characterized above. The aliphatic or linear siloxanes which may be employed in the equilibrium reaction are those which are characterized by the following formula:

(B) 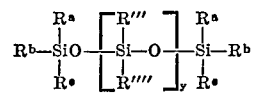

wherein R‴, R⁗, Rᵃ, Rᵇ and Rᶜ, may be any of the organo groups bonded to Si as described above, and in the case of the terminal groups such as the Rᵇ, such groups may be hydroxyl, alkoxy, aroxy, and the like, as well as the organo groups aforedefined. In the above Formulae A and B, x has a value of at least 3 and typically is an average number of not greater than about 8 and y may be 0 up to 80, or more.

The resulting equilibration product, that is, the resulting product of equilibration, has a molecular weight which is greater than the molecular weight of either siloxane used in the equilibration reaction.

The introduction of an epoxyorgano group to a silane or siloxane can be effected in numerous ways. The following general types of reactions are well verified by the art:

(a) Transesterification

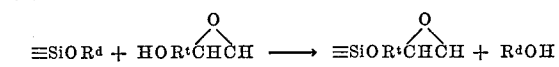

(b) Peroxidation of carbon-carbon double bonds

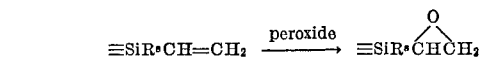

(c) From halohydrins

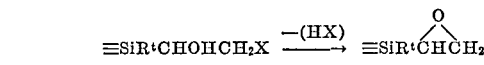

(d) Modified Wurtz reaction

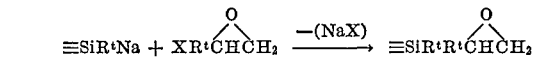

(e) SiH-olefin addition

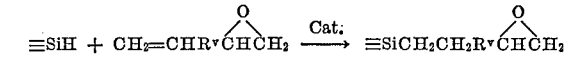

wherein ORᵈ may be alkoxy or aroxy, Rᵗ may be alkylene of from 1 to 6 carbon atoms such as methylene, ethylene, propylene, hexylene, and the like; Rˢ may be a covalent bond or alkylene as defined for Rᵗ, and Rᵛ may be the same as Rˢ or the remaining carbon atoms of a cyclohexylene ring formed with the carbon atoms of the oxirane ring minus a hydrogen atom at the terminal carbon atoms of the vicinal epoxy group as characterized in the unsaturated epoxide of (e) above.

Hydrolyzable silanes containing epoxy groups such as above may be converted into low molecular weight siloxanes as characterized above by hydrolysis either alone or in combination with other hydrolyzable organosilanes. This invention does not reside in the formation of the low molecular weight epoxy substituted siloxanes used in the equilibration reaction since such siloxanes are well known in the art and are formable by reactions described in the art. Such low molecular weight siloxane starting materials contain therein soluble water in amounts characterized above. This water is difficult to remove, and to do so would add a substantial cost to the manufacture of equilibrated products. The attack of water upon the epoxy group had been avoided in the prior art by first forming the high molecular weight copolymeric structure followed by the addition to the polymeric structure of the epoxy substituent. For example, as shown in U.S. Pat. No. 3,431,143, at Example 1, a relatively low molecular weight trimethylsilyl end-blocked dimethylsiloxane, a trimethylsilyl end-blocked methylhydrogen polysiloxane and cyclic dimethylpolysiloxane are equilibrated using concentrated sulfuric acid. Thereafter, there is formed a high molecular weight fluid having a viscosity of 3,000 centipoises and a silanic-hydrogen content for use in adding the ethylenically unsaturated epoxy monomer. This addition reaction is effected with chloroplatinic acid. As pointed out above, many difficulties attend this method for preparation of epoxy substituted organopolysiloxane fluids.

It is most surprising to find, contrary to the statements of Plueddemann et al., that if the reaction is effected with a basic catalyst, equilibration of an epoxy-containing low molecular weight siloxane can be effected in the presence of small quantities of soluble water therein. The advantages of this discovery are most significant in terms of cost reduction in the manufacture of epoxyorganosiloxane fluids of high molecular weight. First of all, there is no necessity to remove the soluble water content of the starting materials before effecting the equilibration reaction. Two, the production of the epoxy-substituted siloxane can be effected in a shorter time. Three, the quality of the siloxane end-product is more uniform. And four, the process of this invention allows for greater versatility in the kinds of siloxane fluids containing epoxy substituents that can be produced. By the process of this invention a wide variety of epoxy siloxanes can be prepared from a single epoxy siloxane adduct. The prior processes for producing epoxy substituted siloxanes require a new silane fluid intermediate for reaction with the epoxy monomer for each epoxy siloxane ultimately to be produced.

The equilibration reaction is effected by simply mixing the low molecular weight polysiloxane, as described above, in the presence of a relatively small quantity of the strong basic catalyst. Typically, the amount of the strong basic catalyst is not in excess of 500 parts per million, based upon the weight of the reactants being equilibrated. Usually the amount of equilibration catalyst exceeds 5 parts per million, basis weight of the reactants being equilibrated. In the most desirable situation, the preferred amount of the basic catalyst employed in the equilibration reaction is typically not less than about 60 parts per million, based upon the weight of the reactants, up to about 100 parts per million, based upon the weight of the reactants. The most preferred amounts of catalyst ranges between about 80 parts per million, based on the weight of the reactants, to about 100 parts per million, based on the weight of the reactants.

The temperature at which equilibration is effected may be as low as 50° C. to as high as 220° C.; preferably the temperature range is between about 70° C. to about 160° C.

The reaction may be effected in the presence of solvents. The preferred solvents are hydrocarbon solvents, particularly the aromatic hydrocarbons such as toluene, xylene, benzene, and the like. Useful solvents are also the alkanes such as hexane, nonane, and the like. However, an added advantage of this invention is that the equilibration reaction can be effected in the absence of solvents and hence, a material savings in solvent removal and recovery is realized. In the preferred practice of this invention solvents are not employed in effecting the equilibration reaction.

A further advantage in the practice of this invention resides in the manufacture of the starting materials. In effecting the addition reaction between the ethylenically unsaturated epoxy monomer and the silanic hydrogen containing low molecular weight polysiloxane to produce the epoxy substituted siloxane to be used in the equilibration reaction, it has been determined that considerably less epoxy monomer is needed in the reaction. Thus, in the prior art processes of adding the ethylenically unsaturated epoxy monomer to the high molecular weight silanic hydrogen containing polysiloxane copolymer fluid, excesses of about 100% of that needed for complete reaction is required to achieve the desired epoxy content in the resulting fluid. However, in reacting such epoxy monomers with much lower molecular weight silanic hydrogen containing fluids, it has been found that not more than 20 weight percent excess of the epoxy monomer is required to achieve the desired epoxy concentration in the low molecular weight siloxane used in the equilibration reaction. The resulting equilibrated product achieves epoxy levels fully equivalent to those obtainable by the prior art with material savings in recovery of unreacted epoxy monomer and the reduction in losses of epoxy monomer by virtue of unwanted polymerization occurring during the addition reaction.

A further advantage resulting from the process of this invention is that the final equilibrated epoxy siloxane copolymer fluid possesses a unique color property. Most siloxanes on storage develop increased color or do not change in color one way or the other. The epoxy siloxanes produced in accordance with this invention are found to actually become lighter in color upon storage. The basis for this is not understood and is considered a rather unusual phenomona. Thus, the equilibration reaction described herein causes a substantial improvement in the color of the product thereby enhancing its usefulness in application on fabrics or paper.

EXAMPLE 1

A 10 mole percent excess of 3,4-epoxycyclohexylethylene, total weight of 121.4 grams, was charged to a 1 liter pot fitted with agitator, addition funnel, water condenser, thermometer and nitrogen sparge tube. To the addition funnel is added 250 grams of a trimethylsilyl end-blocked dimethyl and methyl hydrogen siloxane copolymer fluid having a viscosity of 19 centistokes at 25° C. and a Si—H content of 80 cc. $H_2$/gram. The siloxane in the addition funnel is sparged lightly at room temperature with nitrogen gas. Then the contents in the pot are heated to 100° C. simultaneously with a 0.25 liter per minute nitrogen sparge and agitation. The contents are thereafter cooled to 80° C. and the charge of 3,4-epoxycyclohexylethylene content in the pot is adjusted for any losses during treatment. An addition of about 10% of the siloxane fluid in the addition funnel is added to the pot with 1.5 cc. of a 3.3% chloroplatinic acid solution to provide 50 parts per million of platinum in the pot based upon the total amount of the reactants to be charged eventually into the pot. The chloroplatinic acid is dissolved in dimethylether of ethylene glycol. After this addition, an exotherm is noted and the remaining siloxane fluid in the addition funnel is added with cooling over an hour to maintain the temperature between 75 and 90° C. At the end of the siloxane fluid addition, heat is applied to maintain the pot temperature at 80° C. for an additional hour. After cooling the low molecular weight polymer had the following properties.

viscosity—223 centistokes at 25° C.
epoxy content ($C_2O$)—10.6%
color—7 GVS
residual SiH—0.0095 cc. $H_2$/gram.

EXAMPLE 2

Employing the procedure of Example 1, there was employed 250 grams of a trimethyl silyl end-blocked dimethyl and methyl hydrogen polysiloxane fluid having a viscosity of 28.6 centistokes at 25° C. and a SiH content of 75.50 cc. $H_2$/gram and 119.9 grams of 1-allyloxy-2,3-epoxypropane. These were reacted in the presence of chloroplatinic acid as described in Example 1 employing 50 parts per million platinum in the reaction mixture. The resulting product, 366 grams, has the following analysis:

viscosity—107.4 centistokes at 25° C.
epoxy content ($C_2O$)—11.4%
color—6 GVS
SiH content—0.046 cc. $H_2$/gram
unreacted 1-allyloxy-2,3-epoxypropane—4.0%
isomerized 1-allyloxy-2,3-epoxypropane—2.1%

EXAMPLE 3

In the table which follows, there is described the manufacture of a number of epoxy siloxanes employing the procedures of Example 1 with the exception for experiment $d$. The SiH fluid with the exception of those described in experiments $c$ and $d$ are characterized in the same manner as set forth in Example 1 except for differences in viscosity and hydrogen content. In experiment $c$, the SiH fluid is as characterized in the table. In experiment $d$, the SiH fluid is the same as that employed in experiment $c$ and the reaction is carried out as follows: 50 grams of MD′M, 20 grams of 2,3-epoxypropanol-1 and 350 grams of benzene were added to a liter pot fitted with an agitator, thermometer and condenser. To the pot was added N,N′-diethylhydroxylamine in the amount of 0.7 gram and the contents of the pot were heated to 80° C. for 13 hours; after which time the crude was distilled to give a product [1,1,1,3,5,5,5-heptamethyl-3-(2,3-epoxypropoxy)trisiloxane] of 85 weight percent purity.

EXAMPLE 4

Forty-two grams of epoxy siloxane prepolymer prepared in Example 1 and 358 grams of dimethyl depolymerizate (principally a mixture of octamethylcyclotetrasiloxane and hexamethylcyclotrisiloxane, containing 10–15% by weight of the latter and about 5% by weight of decamethylpentacyclosiloxane) were charged to a one-liter pot fitted with agitator, water condenser, thermometer and $N_2$ sparge tube. The system was heated to 90° C. with a slight $N_2$ sparge. At 90° C., 2 grams of tetramethylammonium dimethyl siloxanolate was added and held at temperature for 3 hours after which time the catalyst was inactivated by heating to 150° C. and holding one-half hour. After cooling to room temperature the product had the following analysis:

Viscosity=3,078 cstk.
Epoxy Content ($C_2O$)=1.14%
Color=3 G.V.S.
Residual SiH=0.0006 cc. $H_2$/gm.
Solids=83.4%

EXAMPLE 5

The table which follows shows the effects of other typical siloxane equilibration catalysts when run using the same starting materials and procedure given in Example 4 except for the catalyst and the amount thereof, and the equilibration conditions noted in the table.

| Catalyst concentration | Equilibration conditions | Equilibrate analysis ||||
|---|---|---|---|---|---|
| | | Viscosity (centistokes) | Color (GVS) | Epoxy (percent) | SiH (cc. $H_2$/gram) |
| 100 p.p.m.[1] tetramethylammonium dimethylsiloxanolate | 90° C. for 3 hours | 7,910 | 3 | 1.10 | 0.0005 |
| 100 p.p.m.[1] TMAH [2] | do | 5,270 | 2 | 1.11 | 0.0005 |
| 100 p.p.m.[1] potassium dimethylsilanolate | 150° C. for 3 hours | 7,260 | 2 | 1.12 | 0.0005 |
| 200 p.p.m.[1] $FeCl_3$ [3] | 90° C. for 1 hour | [4] | [4] | [4] | [4] |
| 2 weight percent [5] $H_2SO_4$ | 25° C. for 0.5 hour | [4] | [4] | [4] | [4] |

[1] Parts per million based on weight of reactants.
[2] TMAH=$(CH_3)_4NOH \cdot 5H_2O$.
[3] Anhydrous ferric chloride.
[4] Epoxy polymerization with little siloxy equilibation.
[5] Percent by weight of reactants.

EXAMPLE 6

Example 4 was repeated except that the epoxy-substituted siloxane of experiments $b$, $c$ and $d$ of Example 3 were substituted for the epoxy siloxane of Example 1 as employed in Example 4. The same weight ratios of the epoxy siloxane to the dimethyl depolymerizate was employed. The results of the reaction using the different epoxy siloxanes from Example 3, indicated as $b$, $c$ and $d$ in making an equilibrated product are set forth in the table which follows:

| Experiment | SiH fluid || Epoxide | Product analysis ||||
|---|---|---|---|---|---|---|---|
| | Viscosity (centistokes) | SiH (cc. $H_2$/gram) | | Viscosity (centistokes) | Epoxy (percent) | Color (GVS) | SiH (cc. $H_2$/gram) | Epoxy (percent) |
| $a$ | 29.0 | 81.5 | 3,4-epoxycyclohexylethylene | 340 | 10.5 | 5 | 0.004 | 2.3 |
| $b$ | 28.6 | 78.5 | 1-allyloxy-2,3-epoxypropane | 107 | 11.5 | 6 | 0.04 | 4.0 |
| $c$ | MD′M[1] | | 3,4-epoxy-1-butene | 95 percent product (GCA[2]) after distillation ||||
| $d$ | MD′M[1] | | 2,3-epoxypropanol-1 | 85 percent product (GCA[2]) after distillation ||||

[1] MD′M=1,1,1,3,5,5,5-heptamethyltrisiloxane.
[2] Gas chromatographic analysis.

| Epoxy siloxanes from Example 3 | | Viscosity (centistokes) | Color (GVS) | Epoxy (percent) |
|---|---|---|---|---|
| $b$ | ≡SiCH$_2$CH$_2$CH$_2$OCH$_2$CHCH$_2$ (epoxide) | 7,500 | 2 | 1.20 |
| $c$ | ≡SiCH$_2$CH$_2$CHCH$_2$ (epoxide) | 46 | <1 | 1.05 |
| $d$ | ≡SiOCH$_2$CHCH$_2$ (epoxide) | | | 1.07 |

EXAMPLE 7

Example 4 is repeated using the same epoxy siloxane of Example 1 but adding with each experiment $a$ through $f$, inclusive, other substituted siloxanes as indicated in the table which follows. All of the conditions set forth in Example 4 were repeated with each experiment *a* through *f* except for the ratio of the reactants equilibrated. The properties of each equilibrated product is recited in said table.

to a plurality of details, it is not intended that such details shall act to limit this invention.

What is claimed is:

1. In the process of equilibrating a mixture of organosiloxanes, which mixture comprises an organocyclosiloxane and a linear organosiloxane, with about 5 to about 500 parts per million of the mixture of a basic equilibration catalyst, the improvement which comprises equilibrating such a mixture wherein at least one member of said mixture contains an oxirane substituted organo-substituent and said mixture contains water and silanol therein ranging from not less than 0.005 weight percent to not more than 1 weight percent, based on the weight of said mixture.

| Experiment | Epoxy siloxane of Ex. 1 weight in grams | Dimethyl depolymerizate weight in grams | Other substituted siloxanes | Equilibrate analysis ||||
|---|---|---|---|---|---|---|---|
| | | | | Weight in grams | Viscosity CTS at 25° C. | Color (GVS) | Percent by weight epoxy |
| a | 42 | 358 | $(CH_3)_2N[Si(CH_3)_2O]_4Si(CH_3)_2N(CH_3)_2$ | 42 | 95 | 2 | 2.4 |
| b | 42 | 358 | $(CH_3)SiO-[Si(CH_3)_2O]_{180}-[\overset{(CH_2)_4NH_2}{\underset{CH_3}{S}}-O]_{20}-Si(CH_3)_3$ Props: viscosity—1,500 cst.(25° C.); $NH_2$ content—2% wt. | 42 | 8,390 | 1 | 1.5 |
| c | 25 | 213 | $CH_3O-Si(CH_3)_2O-[Si(CH_3)_2O]_{11}-CH_3$. Props.: viscosity—8 cst.(25°C.); $CH_3O$ content—6.5% wt. | 10 | 515 | 3 | 1.1 |
| e | 25 | 213 | Mixture of cyclic tetramers and pentamers $[CH_2=CH(CH_3)SiO]_{4-5}$. | 25 | 8,370 | 5 | 1.0 |
| f | 25 | 213 | Cyanopropylmethylsiloxane cyclic mixture $[NCCH_2CH_2CH_2(CH_3)SiO]$. | 10 | 7,780 | 2 | 1.1 |
| g | 26 | 221 | $[(CH_3)_3SiO]_2-[Si(CH_3)_2O]_{31}-[Si(CH_3)O-\underset{CH_3\ CH_3}{N}]_9$ Props: viscosity—103 cst.(25° C.) $N(CH_3)_2$ content—15.1% wt. | 25 | 2,530 | 4 | 1.1 |

In each of the examples above, the dimethyl depolymerizate employed contained saturated concentrations of water which exceeded 0.005 weight percent. In most instances the water concentration of the dimethyl depolymerizate was about 0.05 weight percent. In each case the dimethyl depolymerizate was not treated to remove its saturated water.

Illustrative of basic equilibration catalysts suitable in the practice of this invention are those characterized by the following chart:

| Cations | Anions |
|---|---|
| Alkali metal bases: | |
| Lithium | Oxides. |
| Sodium | Hydroxides. |
| Potassium | Alkoxides, and aryl oxides (e.g., methoxides. ethoxide. phenoxide). |
| Rubidium | Do. |
| Cesium | Silanolates or siloxanolates (e.g. dimethylsilanolate and dimethylsiloxanolate). |
| Quaternary bases: | |
| Tetraalkylammonium [1] | Hydroxides. |
| Tetraalkylphosphonium [1] | Alkoxides. |
| Trialkylhydrazinium [1] | Silanolates. |
| Trialkylguanidinium [1] | Siloxanolates. |

[1] Wherein the alkyl may be methyl, ethyl, n-propyl, and the like.

An illustrative list of suitable basic catalysts can be found in U.S. Pat. No. 3,398,117, patented Aug. 20, 1968. Also useful is the tris(dimethylamino)phosphine oxide described in that patent.

Though this invention has been described with respect

2. The process of claim 1 wherein the basic catalyst is an ammonium catalyst.

3. The process of claim 1 wherein the equilibrated siloxane has a higher molecular weight than the siloxanes in the mixture.

References Cited

UNITED STATES PATENTS

| 3,431,143 | 3/1969 | Johnson et al. | 117—155 |
| 3,455,877 | 7/1969 | Plueddemann | 260—46.5 |
| 3,477,988 | 11/1969 | Ostrozynski | 260—46.5 |
| 3,132,167 | 5/1964 | Boot | 260—448.2 |

FOREIGN PATENTS

| 739,489 | 7/1966 | Canada | 260—348 |

DONALD E. CZAJA, Primary Examiner

MELVYN I. MARQUIS, Assistant Examiner

U.S. Cl. X.R.

117—139.5 A, 148; 260—46.5 R, 348 SC, 448.2 B